Jan. 25, 1966    M. A. BIRCH    3,230,562
TOOTH BRUSH AND GUM MASSAGER
Filed July 19, 1963    2 Sheets-Sheet 1
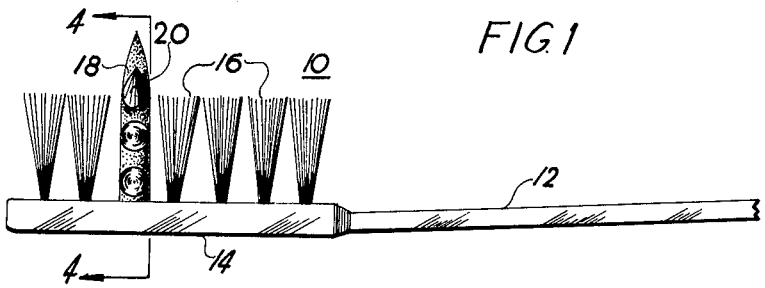
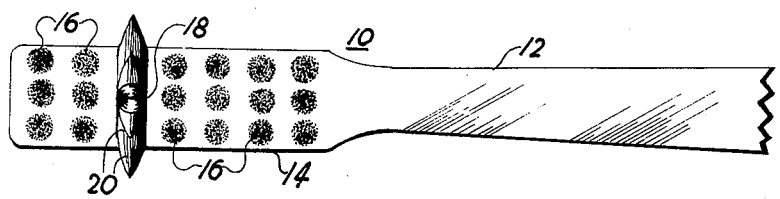
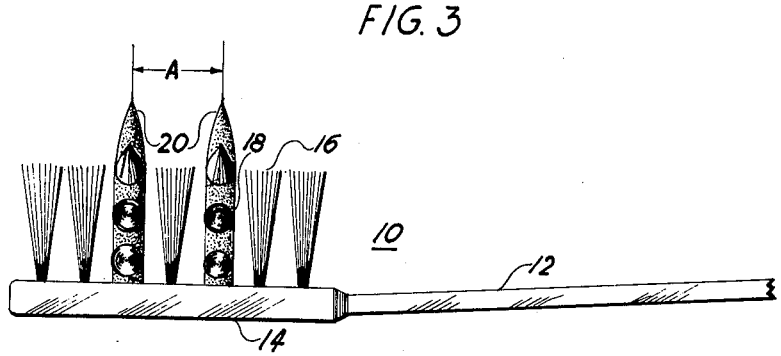
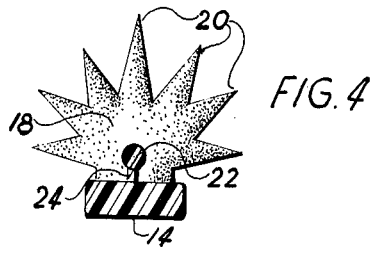
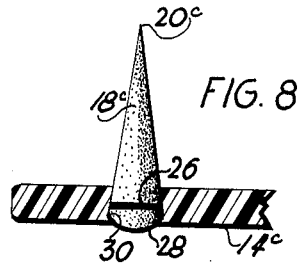
INVENTOR
MARJORIE ANDERSON BIRCH
BY John O. Dickman III
AGENT Jan. 25, 1966 M. A. BIRCH 3,230,562
TOOTH BRUSH AND GUM MASSAGER
Filed July 19, 1963 2 Sheets-Sheet 2

INVENTOR
MARJORIE ANDERSON BIRCH

BY John B. Dickman III
AGENT

United States Patent Office 3,230,562
Patented Jan. 25, 1966

3,230,562
TOOTH BRUSH AND GUM MASSAGER
Marjorie A. Birch, 225 E. 73rd St., New York, N.Y.
Filed July 19, 1963, Ser. No. 296,171
1 Claim. (Cl. 15—110)

This invention relates generally to articles of oral hygiene and more particularly to tooth cleaning and gum massaging brushes.

Attempts have been made in the past to provide in combination with a tooth brush, a feasible and practical gum massager which will provide effective massaging action while maintaining proper cleaning action of the brush. Such prior attempts included having a gum massaging unit located on the end of the handle opposite the bristles and for use separately therefrom. Other attempts resulted in having gum massaging units placed haphazardly among the bristles to provide the massaging action while the teeth were being cleaned. The former article having the massaging unit separate from the bristles was inadequate in many respects. Primarily such a combination lacked the utility of having the gum massaging means in a position to coact with the bristles while cleaning the teeth. Furthermore, such an arrangement usually provided for only one massaging unit, since more would clutter up the handle and impair the use of the tooth cleaning end of the brush. With only one massaging unit available, only one gum tip could be cleaned at a time.

In the latter combination having the gum massagers placed in adjacent relationship to the bristles, the relative position of the massagers with respect to the bristles was, heretofore, haphazardly selected and adequate cleaning and massaging action was consequently impaired. Furthermore, single massaging units extending perpendicularly from the base of the brush were inadequate upon any slight rotation of the brush with respect to the teeth. It is well known in the art that a tooth brush is rotated in its use so that the bristles will be carried from the edge of the gum surface to the biting edge of the teeth. During such rotational use, the single massaging unit would bend and not provide effective massaging action. Furthermore, if the massaging units were centrally located on the brush base, the brush would have to be inserted far up into the space between the gums and the cheek before the massager could come in contact with the gums to any great extent. Such required use of the brush also resulted in the gums being scraped by the bristles which offset the value of employing the massaging units. The haphazard location of the massaging units also gave inadequate massaging action, since, while one unit would be in position between the teeth to provide massaging action to the gum tip, the others may fall on the surface of the teeth and not on the gums. Such massaging action is further complicated by the above mentioned disadvantage of having the massaging tips centrally located between the bristles. The improper spacing of the massaging units will also interfere with and impair the cleaning action of the bristles. That is, if one massaging unit coincides with a gum tip while another falls on the surface of a tooth, the bristles will not come in contact with that tooth surface and its cleaning will be impaired.

It is, therefore, the primary object of this invention to provide gum massaging means in combination with a tooth brush which will provide optimum massaging and tooth cleaning action simultaneously.

It is another object of the instant invention to provide gum massaging means in combination with a tooth brush which will provide substantial protection to the gums from the coarse scraping action of the bristle.

Another object of this invention is to provide gum massaging means in combination with a tooth brush which will be effective in a massaging action regardless of any rotation of the brush.

Yet another object of the present invention is to provide a gum massaging means in combination with a tooth brush which will provide effective massaging action to a greater area of the gums.

Still another object of the instant invention is to provide gum massaging means in combination with a tooth brush which will not require the user to force the article far up the sides of the gums to receive effective massaging action therefrom.

And another object of the present invention is to provide a gum massaging means in combination with a tooth brush which will provide massaging action to several adjacent gum tips simultaneously.

These and other objects of the present invention are carried out by the simple and unique structure in combination with a tooth brush which includes having a plurality of tips either independently secured to the base of the brush or arranged in groups on a main body which will be secured to the base. The primary consideration being that, if more than one massaging unit is employed, the distance therebetween must conform substantially to the width of a tooth so that adjacent gum tips are massaged simultaneously. Those tips which are arrayed in groups on a main body are preferably angularly displaced from one another and each group is also spaced from the other by the width of a tooth.

The present invention will be more fully understood, however, from the following detailed description when taken in conjunction with the accompanying drawings wherein:

FIGURE 1 is side elevational view of one embodiment showing the relative position of a gum massager with respect to the bristles;

FIGURE 2 is a top view of the embodiment shown in FIGURE 1 and illustrating the position and distance of the massaging tips from the sides of the brush;

FIGURE 3 is a side elevational view of the preferred embodiment of the instant invention showing a plurality of massaging units spaced from one another;

FIGURE 4 is a sectional view taken along lines 4—4 of FIGURE 1 showing one embodiment of the massager units;

FIGURE 8 is a partial sectional view of a massaging unit as shown in either of FIGURES 5, 6, or 7 showing one form of securing the unit to the brush body;

Figure 7:
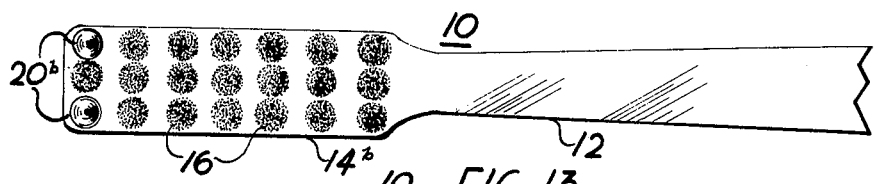
FIGURE 7 is a top view of the embodiment shown in FIGURE 6 showing one selected position of the massaging units.
Figure 13:
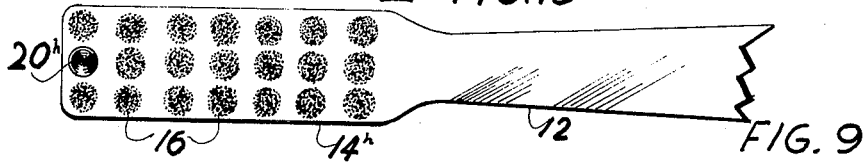

FIGURES 9, 10, 11, and 12 are alternate embodiments and shapes of the massaging unit shown in FIGURE 4 and also showing various forms of securing the massaging units to the brush body; and FIGURE 13 is an alternate embodiment of the combination shown in FIGURE 7 and contains one central massage unit in front.

In the various views of the drawings like reference numerals designate similar or identical parts and elements. Referring to the drawings, FIGURE 1 illustrates one embodiment of the invention and shows a tooth brush assembly 10. The tooth brush includes a handle 12, a base 14, and bristles 16. Secured to base 14 is a gum massager body 18 having a plurality of tips 20, the uppermost tip extending above the ends of the bristles a predetermined distance which will provide optimum tooth cleaning and gum massaging action. The height of the massager tip also serves to substantially protect the gums from the bristles. The tips 20 also extend beyond the sides of the base 14 a predetermined distance as shown in FIGURE 2. It can be seen from FIGURES 1 and 2 that massaging tips 20 extend radially from massager 18 in such a fashion that optimum massaging action is provided while the brush is rotated to provide a cleaning action on the teeth. As shown and illustrated in FIGURE 3, a plurality of gum massaging units 18 with associated tips 20 may be employed. The primary consideration in such an arrangement, is that the massaging units are separated from one another by a distance A which is the approximate width of a tooth. There is no requirement on the number of massaging units which may be employed in such a configuration as long as the distance between them is held to the dimension A.

FIGURE 4 is a cross sectional view taken along lines 4—4 of FIGURE 1 and shows the radial relationship of tips 20 with respect to one another. This massaging unit may be employed as well in the configuration shown by FIGURE 3. Also illustrated in FIGURE 4 is one means of securing the massaging unit body 18 and base 14. An upstanding support 24 having an enlarged ball portion 22 integral with the head 14 is inserted in a preformed recess in the unit 18.

Figure 5:
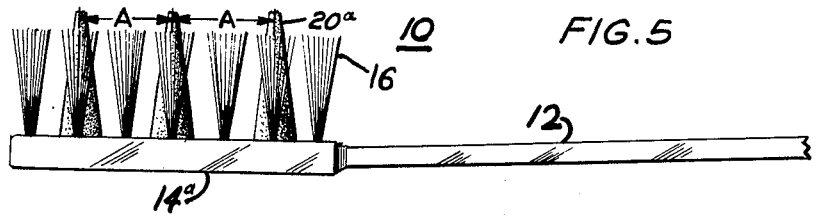
FIGURE 5 is a side elevational view of another embodiment showing single pointed massaging units selectively positioned on the brush body.
Figure 6:
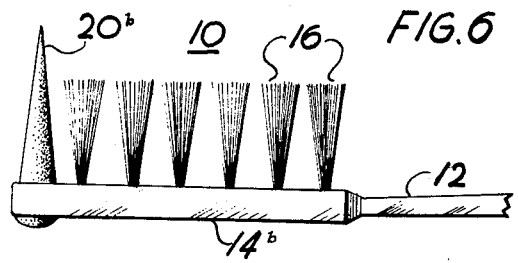
FIGURE 6 is side elevational view of still another embodiment showing single pointed massaging units selectively positioned on the brush body, but in a different relationship to each other than those of FIGURE 5.

FIGURE 5 shows another embodiment and illustrates the use of massaging tips 20a secured to base 14a in any suitable manner and at a distance A from one another. The distance A is again to be understood to be the approximate distance of the width of a tooth. The massaging units shown in FIGURE 5 may be of the single pointed ones as shown therein or they may be of the type shown in FIGURES 4, 9, 10, or 11. Furthermore, the single pointed massagers shown could be positioned on the sides of base 14b as shown in FIGURES 6 and 7 and along the length of the base as illustrated in FIGURE 5. This arrangement would protect the gums from the bristles while sustaining adequate massaging action with the use of single pointed massagers.

The embodiment of FIGURES 6 and 7 illustrate the use of two single pointed massagers 20b at the front foremost end of the brush and at opposite corners thereof. In the place of the two single pointed massagers shown, a single unit having a plurality of tips could be employed to perform equally as well or better depending upon which one is preferred. The massaging means being located forward of the bristles provides a positive massaging action when it is required. It is to be understood as described above, that these units could also be employed along the length of the brush and spaced from one another the distance A with the front unit or units being positioned as those of FIGURES 6 and 7.

FIGURE 8 illustrates one manner of securing a single pointed massager 18c having a tip 20c to a base 14c. A hole 26 is provided in the base for receiving the massager 18c and a retaining plug 28. The base 14c includes a lip portion 30 extending into a hole 26 which locks plug 28 into place. During initial assembly the massager 18c is inserted through hole 26 from the bottom and retaining plug 28 is snapped therein over lip 30 to provide a positive locking action between the massager and base 14c.

Figure 9:
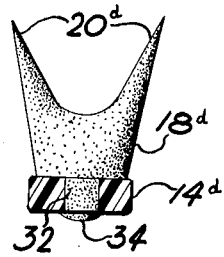

FIGURE 9 illustrates another embodiment of a massager unit 18d. Tips 20d extend above the bristles and beyond the sides thereof to provide all the advantages of the massager of FIGURE 4. Another form of securing massager 18d to base 14d is shown herein and includes a stem portion 32 and a flanged portion 34 integral with body 18d. The flange portion holds body 18d from being withdrawn easily from base 14d.

Figure 10:
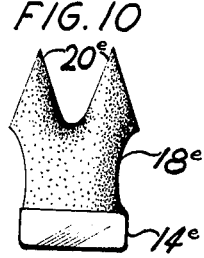

FIGURE 10 shows another embodiment of the massager unit 18e on base 14e and differs from that of FIGURE 9 only in design. The tips 20e of the massager shown therein on the base 14e are spaced within the bounds of the sides of the bristles rather than extending beyond them as those of FIGURE 9.

Figures 11, 12:
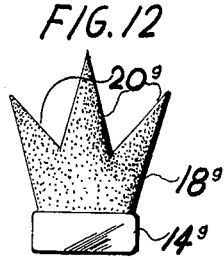

FIGURE 11 shows still another structure for retaining the massager 18f with tips 20f to base 14f. A resilient loop member 36 is integral with body 18f and stretches sufficiently to be pulled over the bristles to be placed on body 14f between the tufts of bristles thereon. With this construction the massager units can be taken off and put on with ease by the user. Various designs of the massager units may be used with the various retaining means shown and is not limited to the combinations shown in the drawings.

FIGURE 12 is still another embodiment of the massaging unit design. This shows a slightly different arrangement of the tips 20g on the massager 18g. The massager is attached to the base 14g in any of the aforementioned ways. With this design the gums will receive complete massaging action during rotation of the brush with respect to the teeth.

FIGURE 13 is another embodiment of the structure illustrated in FIGURE 7 and includes a single massaging point 20 surrounded on three sides by bristles 16.

Obviously numerous modifications and variations of the present invention are possible in the light of the above teachings. It is, therefore, to be understood that within the scope of the appended claim the invention may be practiced otherwise than as specifically described therein. Therefore, the exemplifications shown and described in the detailed description may be varied in accordance with one's desires without departing from the spirit of the instant invention or the scope of the appended claim.

What is claimed is:

In combination with a tooth cleaning brush having a handle and a longitudinally extending head with longitudinally and transversely spaced tufts of bristles carried thereby and extending therefrom, gum massaging means comprising massager bodies attached to said head and extending transversely between adjacent tufts of bristles, a plurality of massaging tips formed on said massager bodies and extending radially upwardly and outwardly from each of said massager bodies, the uppermost of said tips extending substantially above the tops of said bristles, each of said tips on each of said bodies being angularly displaced with respect to the other of said tips thereon, the free ends of each of said tips on each body being in the same plane as the corresponding tips on the other of said bodies, the longitudinal spacing of the tips on each body from the corresponding tips on the adjacent body being approximately the width of a tooth.

References Cited by the Examiner

UNITED STATES PATENTS

| 301,644 | 7/1884 | Thompson | 15—110 X |
|---|---|---|---|
| 1,153,409 | 9/1915 | Wheeler | 15—110 |
| 1,191,556 | 7/1916 | Blake | 15—117 |
| 2,042,239 | 5/1936 | Planding | 15—110 |
| 2,044,863 | 6/1936 | Sticht. | |
| 2,139,245 | 12/1938 | Ogden | 15—110 X |
| 2,435,421 | 2/1948 | Blair | 15—4 X |
| 2,736,917 | 3/1956 | Goldstein et al. | 128—62.1 X |

FOREIGN PATENTS

| 904,687 | 2/1954 | Germany. |
|---|---|---|

DANIEL BLUM, *Primary Examiner.*

CHARLES A. WILLMUTH, *Examiner.*